United States Patent [19]

Waldkirch et al.

[11] 4,402,278
[45] Sep. 6, 1983

[54] DRAGEE-MAKING DRUM WITH PARTITION WALL FOR SEPARATING THE BLACK ZONE FROM THE GREY ZONE

[75] Inventors: Kurt Waldkirch; Gunther Seifried, both of Mannheim; Egon Krohn, Uetersen, all of Fed. Rep. of Germany

[73] Assignee: PS Pharma Maschinen und Gerate GmbH, Mannheim, Fed. Rep. of Germany

[21] Appl. No.: 343,106

[22] Filed: Jan. 27, 1982

[51] Int. Cl.³ .......................... A23G 3/20; B05C 3/00; A01J 21/00
[52] U.S. Cl. ...................................... 118/19; 118/20; 118/418; 425/73; 425/75
[58] Field of Search ...................... 425/73, 75; 118/19, 118/20, 418

[56] References Cited

U.S. PATENT DOCUMENTS

| 2,561,055 | 7/1951 | Hood | 264/330 |
| 2,709,833 | 6/1955 | Wiklund | 425/222 |
| 3,302,608 | 2/1967 | Coons et al. | 118/19 |

Primary Examiner—H. S. Cockeram
Attorney, Agent, or Firm—Staas & Halsey

[57] ABSTRACT

A dragee-making drum cooperating with a partition wall in order to promote cleanliness, particularly during the manufacture of medical preparations, by increasing the isolation between the clean "grey" zone in front of the partition wall and the dirtier "black" zone behind it. This increased isolation is accomplished by providing a flanged rim at the mouth of the drum to fit within a corresponding U-shaped seal disposed at the opening of the partition wall. An opening is provided at the bottom of the seal for removal of debris.

2 Claims, 1 Drawing Figure

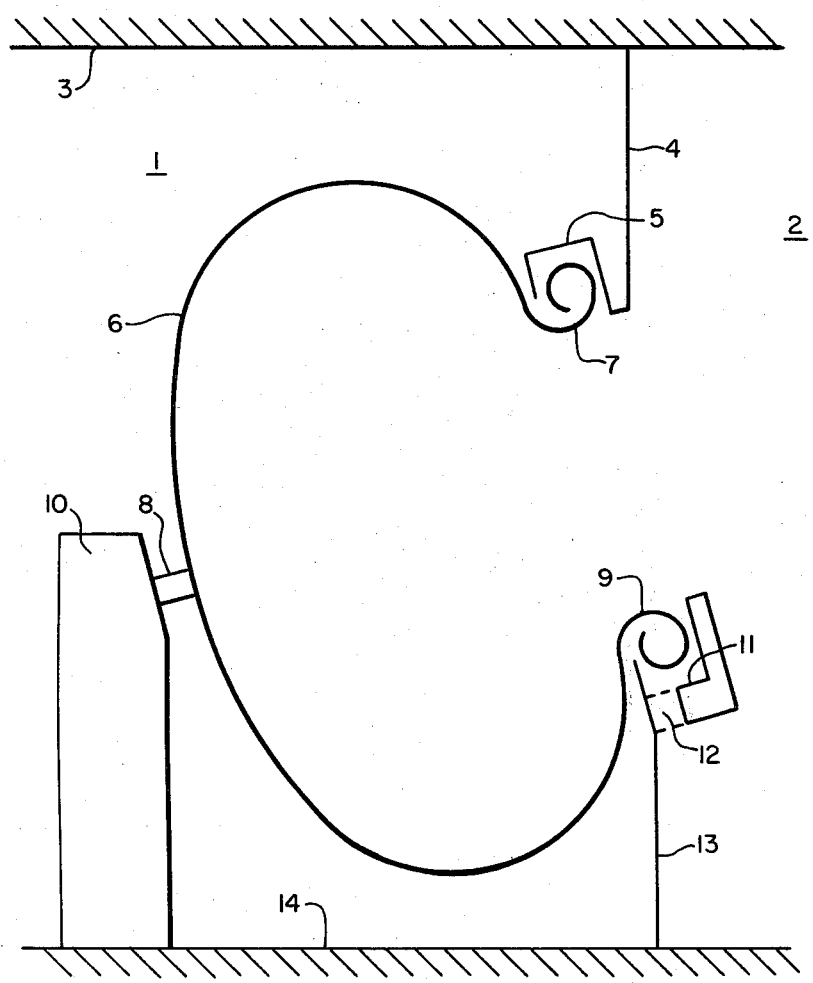

DRAGEE-MAKING DRUM WITH PARTITION WALL FOR SEPARATING THE BLACK ZONE FROM THE GREY ZONE

BACKGROUND OF THE INVENTION

The invention relates to a dragee-making drum having a partition wall for separating the block zone from the grey zone.

Dragee-making drums are known which are placed in a slanting position. As a rule, they are placed in the black zone and are separated from the grey zone by a partition wall. The "black zone" is the dirtiest production zone during the fabrication of medical preparations. The "grey zone", on the other hand, is the clean zone. Usually the conventional partition wall has in the area of the mouth of the dragee-making drum, that is to say, the opening thereof, an equally large recess. Thus, it is possible to operate (i.e., fill, empty, clean) the dragee-making drum from the grey zone. The necessarily dirty parts of the drive mechanism, which not only produce noise but also dirt and oil accumulation, are shielded from the grey zone by the partition wall. This partition wall thus has the purpose of preventing dust particles from these parts of the drive mechanism from penetrating into the grey zone, which must meet a certain degree of cleanness.

However, in the prior art the separation of the black zone from the grey zone by a partition wall is not completely leakproof. This is because the drum rim must be spaced sufficiently far from the partition wall. Sufficiently far, in this case, means that an adequate clearance must be provided for the unbalance motions of the dragee-making drum or of the drum rim, so that collision with the partition wall remains impossible. Therefore, a large air gap has heretofore been provided between the drum rim and the partition wall. Experience has shown that dirt penetrates from the black zone to the grey zone through this air gap.

SUMMARY OF THE INVENTION

A general object of the invention is to render this air gap between drum rim and partition wall harmless.

This object is achieved by the invention by placing on the partition wall adjacent to the drum rim a U-seal, in the channel of which the drum rim is arranged.

Advantage is taken of the fact that the rim of the dragee-making drum is an inwardly flanged inverted area of the border of the dragee-making drum plate, that is to say, the plate of the dragee-making drum in the area of the drum rim is curved around outwardly and bent back inwardly until it terminates in a curl. According to the invention, this projecting drum rim which, viewed from outside, is round, is placed in the channel of a U-shaped seal. Accordingly, this U-shaped seal, briefly referred to as the U-seal, is arranged along the rim of the partition wall. Therefore, this partition wall rim is approximately as large, and shaped, as the mouth of the dragee-making drum.

BRIEF DESCRIPTION OF THE DRAWING

The FIGURE is a cross-sectional side view illustrating the invention in schematic form.

DESCRIPTION OF THE PREFERRED EMBODIMENT

The partition wall between the black zone (1) and the grey zone (2) consists of the upper partition wall (4) and the lower partition wall (13). The upper partition wall (4) closes with the cover (3) of the production chamber. The lower partition wall (13) closes with the floor (14) of the production chamber. The dragee-making drum (6) is placed on the axle (8), as usual in a slightly slanting position. This axle (8) is mounted in the support (10) and is driven. The drum rim (7) is flanged outwardly and curled inwardly. Thus, viewed from the outside, the drum rim (7) appears as a round ridge which protrudes outwardly from the mouth of the dragee-making drum. This ridge lies in the channel of the U-seal (5). The U-seal (5) of the partition wall is therefore shaped to match the mouth of the dragee-making drum. As a rule, the mouth of the dragee-making drum is round. Thus, the U-seal (5) forms a rim, in the channel of which the equally ring-shaped drum rim (7) is arranged.

In a preferred embodiment of the invention, an opening (12) is made at the lowest point (11) of the U-seal (5). This opening (12) enters the channel of the U-seal (5) and enables abrasion particles, particularly fragments of dragee, to drop to the floor (14). Thus the opening (12) goes completely through the U-seal (5).

What is claimed is:

1. An improved dragee-making drum having a mouth that is accessible through an opening in a partition wall that is disposed adjacent the mouth of the drum and that separates the grey zone on the side of the wall from which the mouth is accessible through the opening from the black zone on the other side of the wall, wherein the improvement comprises: the mouth of the drum is provided with a flanged rim, and a U-seal providing a channel therein is disposed on said partition wall at the opening therein, the flanged rim being positioned within the channel.

2. A dragee-making drum according to claim 1, wherein said U-seal has an opening communicating with said channel at its lowest point.

* * * * *